No. 845,356. PATENTED FEB. 26, 1907.
J. J. HUGGINS.
BALING MACHINE.
APPLICATION FILED MAY 9, 1906.
3 SHEETS—SHEET 1.
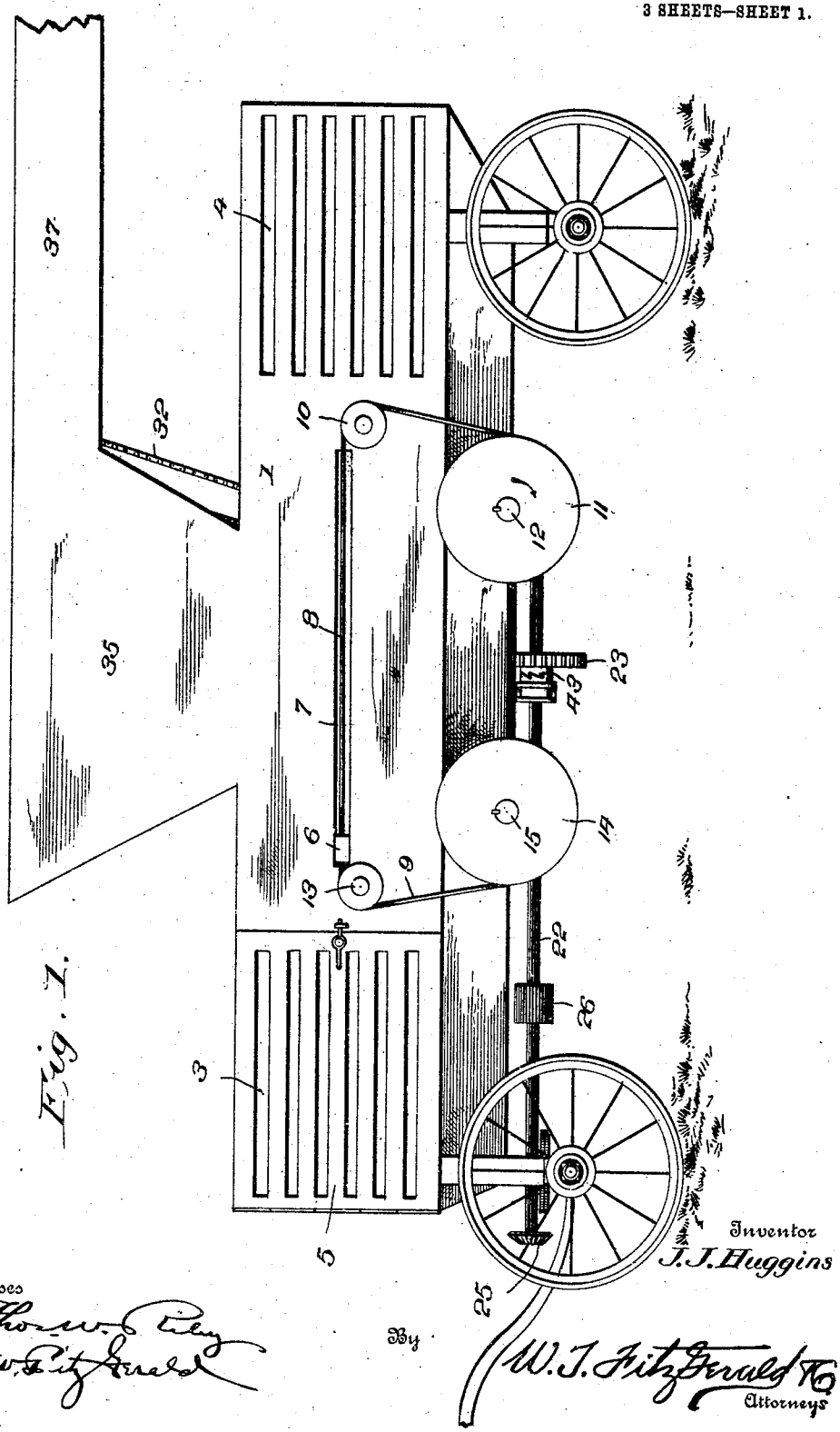

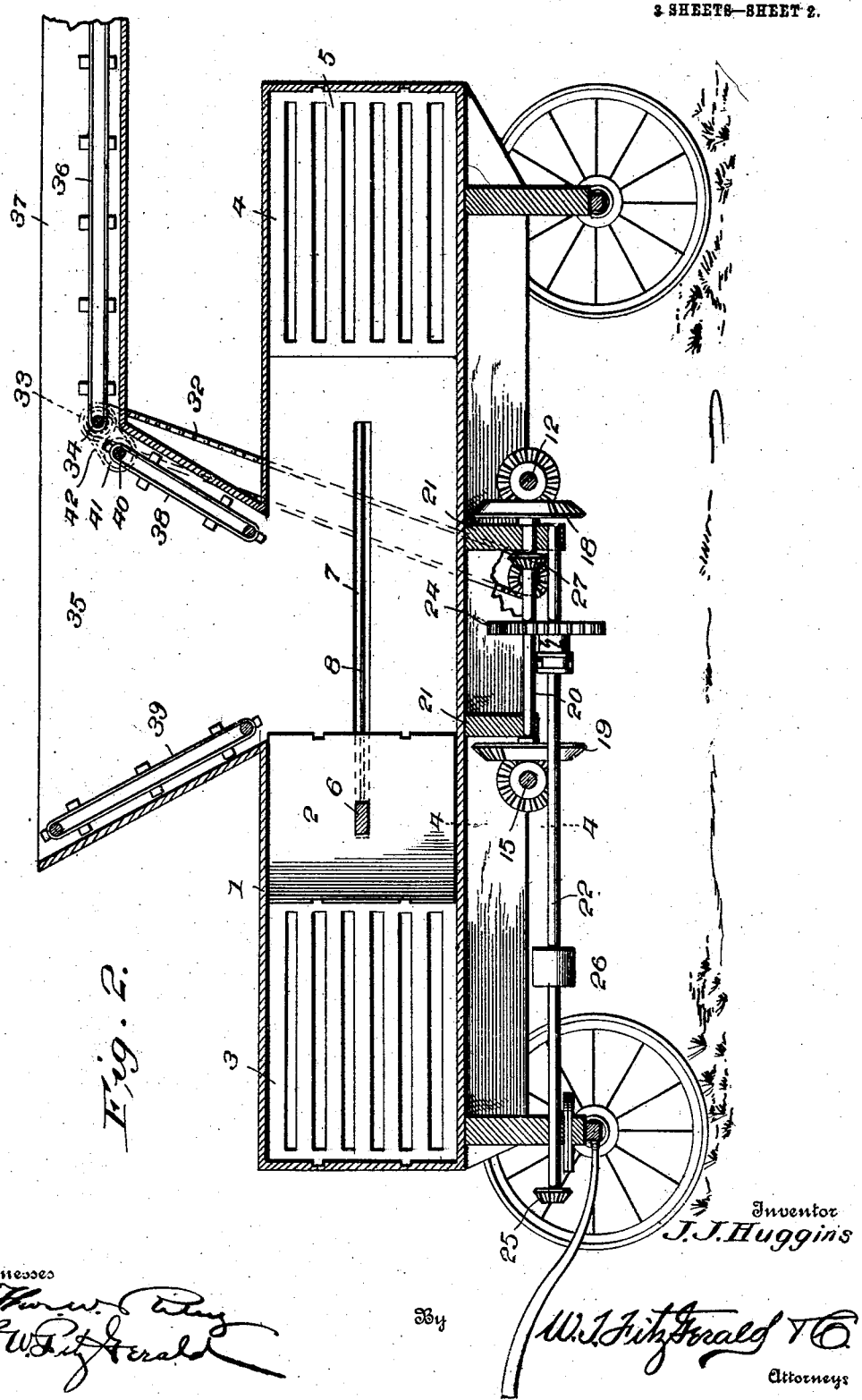

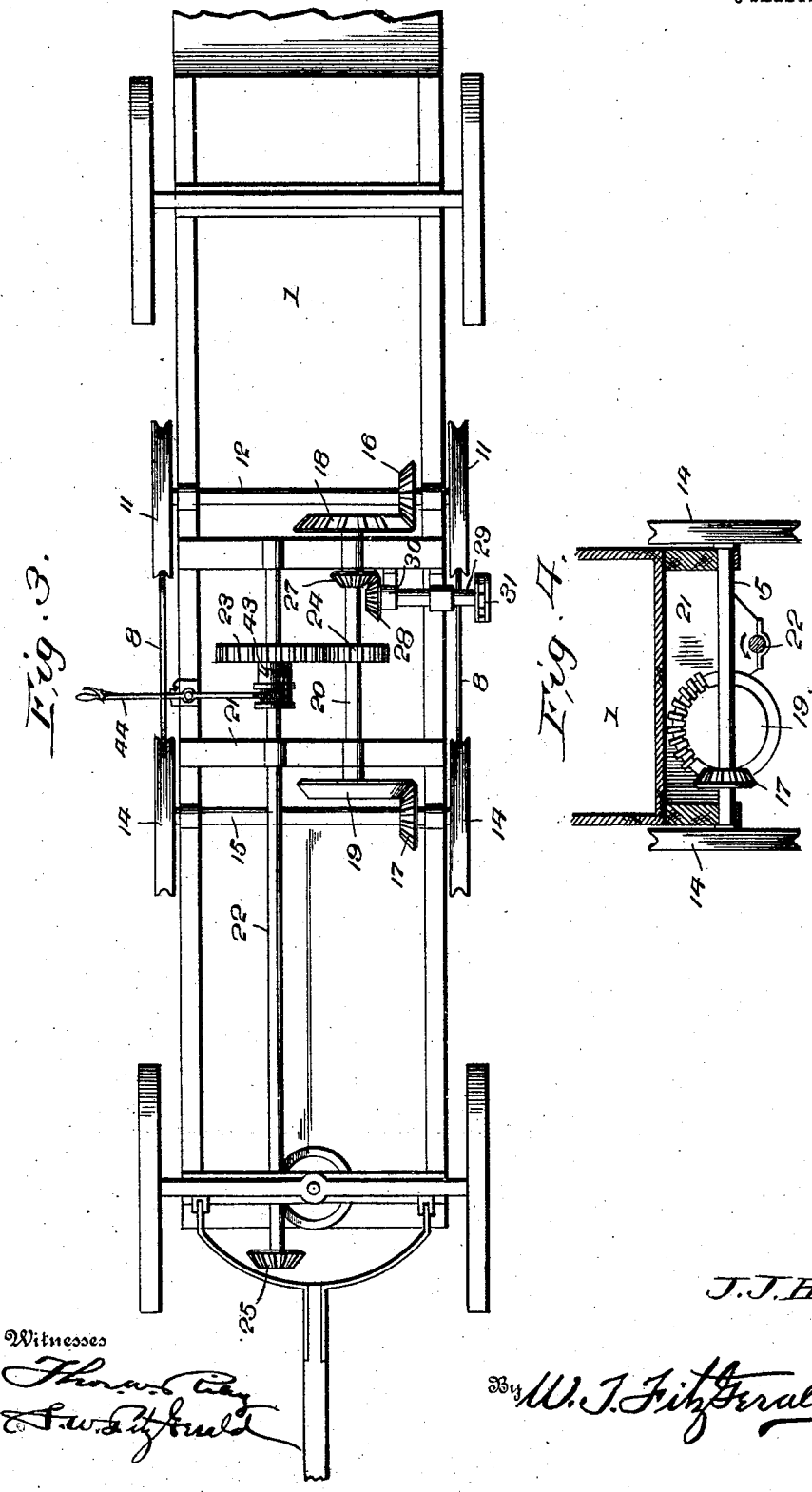

UNITED STATES PATENT OFFICE.

JOHN J. HUGGINS, OF FULTON, KENTUCKY.

BALING-MACHINE.

No 845,356.  Specification of Letters Patent.  Patented Feb. 26, 1907.

Application filed May 9, 1906. Serial No. 315,932.

*To all whom it may concern:*

Be it known that I, JOHN J. HUGGINS, a citizen of the United States, residing at Fulton, in the county of Fulton and State of Kentucky, have invented certain new and useful Improvements in Baling-Machines; and I do hereby declare the following to be a full, clear, and exact description of the invention, such as will enable others skilled in the art to which it appertains to make and use the same.

My invention relates to hay-balers; and my object is to provide means for utilizing both strokes of the plunger to compress hay, straw, or the like at both ends of the baler-frame.

A further object is to provide means to reciprocate the plunger in both directions without reversing the movement of the main driving-shaft.

A further object is to provide means for directing the hay, &c., into the compression-chamber.

Other objects and advantages will be hereinafter made clearly apparent in the specification and pointed out in the claims.

In the accompanying drawings I have shown the preferred form of my invention.

In said drawings, Figure 1 is a side elevation of my improved baler complete. Fig. 2 is a central longitudinal sectional view thereof. Fig. 3 is a bottom plan view showing the operating mechanism; and Fig. 4 is a detail sectional view as seen from line 4 4, Fig. 2.

Referring to the drawings by numerals of reference, 1 indicates the frame of my improved baler, said frame having mounted therein a suitable plunger 2, which is so arranged that it will compress hay, straw, or the like into the compression-chambers 3 and 4 at opposite ends of the frame 1, said compression-chambers being provided with slatted doors 5, whereby the bales after being properly tied can be readily removed. The plunger 2 is centrally intersected by a cross-head 6, said cross-head projecting through slots 7 in the sides of the frame 1 and has secured to the outer ends thereof operating-cables 8 and 9, the cables 8 being secured to one side of the cross-head 6, extending thence over sheaves 10 and into engagement with channeled drums 11, carried on a shaft 12, while the cables 9 are secured to the opposite side of the cross-head 6 and extend over sheaves 13 and into engagement with channeled drums 14, mounted on a shaft 15, it being understood that the above-mentioned cables, sheaves, and drums are provided upon each side of the frame 1. Each of the shafts 12 and 15 is provided with bevel-gears 16 and 17, respectively, with which are adapted to mesh mutilated gears 18 and 19, respectively, said gears being mounted upon a suitable shaft 20, carried in brackets 21, secured to the lower side of the frame 1. The shaft 20 is driven through the medium of a power-shaft 22, said shaft having a gear 23 mounted thereon, which meshes with a similar gear 24, secured to the shaft 20.

My improved baler is designed to be operated either by horse-power or other motive power, and when used in connection with horse-power the forward end of the shaft 22 is provided with a bevel-gear 25, with which meshes a suitable gearing on the power mechanism. (Not shown.) If, however, the baler is operated by means of an engine, a belt-wheel 26 is mounted upon the shaft 22, as shown in Figs. 1 and 2 of the drawings. The shaft 20 is also provided with a bevel-gear 27, with which meshes a similar gear 28, carried by one end of a stub-shaft 29, said shaft being secured to the frame 1 in any suitable manner, as by boxings 30. To the outer end of the shaft 29 is secured a sprocket-wheel 31, around which takes a sprocket-chain 32, the opposite end of said chain being directed over a sprocket-wheel 33, mounted upon a shaft 34, said shaft being disposed laterally through one edge of a hopper 35, said hopper being mounted upon the upper surface of the frame 1.

The hay, &c., is directed into the hopper 35 by means of a slatted carrier 36, which is disposed in a trough-like way 37, extending from one edge of the hopper 35, said carrier being disposed around the shaft 34 and travels therearound when power is applied to said shaft. The slanting walls of the hopper 35 are also provided with carriers 38 and 39, respectively, whereby the hay, &c., directed into said hopper by the slatted carrier 36 will more readily enter into the path of the plunger 4. The shaft 40, around which takes the carrier 38, is extended at one end and provided with a sprocket-wheel 41, said wheel being adapted to receive a sprocket-chain 42, said chain extending around a similar sprocket on the shaft 34. The mutilated gears 18 and 19 are so disposed on the shaft 20 that when the teeth upon one of the mutilated gears is in mesh with one of the gears 16 or 17 the teeth on the opposite mutilated gear will be out of mesh. The gear 23 is provided with a clutch mechanism 43, said mechanism being disposed around the shaft 22 and is operated by means of a controlling-lever 44, so that when it is desired to stop the movement of the plunger the clutch mechanism is moved out of engagement with the gear 23 and the plunger and operating mechanism stopped, while the driving-shaft may continue to rotate.

In operation, supposing that the plunger is in the position shown in Fig. 2 of the drawings, when power is applied to the shaft 22 said shaft is rotating in the direction indicated by the arrow upon Fig. 4 of the drawings. The teeth on the mutilated gear 18 will be directed into mesh with the bevel-gear 16 and the drums 11 rotated in the direction indicated by the arrow in Fig. 1 of the drawings, thereby winding the cables over said drums and drawing the plunger 2 to the opposite end of the frame 1 and compressing the hay, straw, &c., into the compression-chamber 4, and by a continuous rotation of the shaft 22 the mutilated gear 18 will be directed out of engagement with the gear 16 and the mutilated gear 19 into engagement with the gear 17, thereby winding the cables 9 around the drums 14 and disposing the plunger 2 to the opposite end of the frame 1 and compressing the hay, &c., into the compression-chamber 3. It will therefore be seen that by this construction the plunger 2 will be driven from end to end of the frame 1 without reversing the motion of the power-shaft.

What I claim is—

1. A baler of the class described comprising a frame, compression-chambers in said frame, a plunger between said chambers, a cross-head through said plunger and extending through slots in said frame, cables secured to said cross-head, drums rotatably mounted on said frame, the opposite ends of said cables being secured to said drums, shafts carrying said drums, gear-wheels secured to said shafts, a shaft transversely disposed to the first-mentioned shafts, mutilated gears at each end of said shaft adapted to engage the gears on the first-mentioned shafts, a power-shaft, and means interposed between said power-shaft and transversely-disposed shaft to rotate the same whereby said plunger will be moved from end to end of the frame.

2. A baler of the class described comprising a frame having a compression-chamber at each end thereof, a plunger in said frame and between said chambers, a cross-head extending laterally from said plunger and through elongated slots in the sides of the frame, sheaves at each end of said slots, a pair of cables secured to each end of said cross-head and extending in opposite directions and over said sheaves, a channeled drum for each of said cables upon which said cables are adapted to be wound, supporting-shafts for said drums, bevel-gears on said shafts, driving means for said shafts and mutilated gears interposed between said driving means and the bevel-gears on said shafts whereby the shafts will be oppositely rotated and the plunger reciprocated without changing the rotation of the driving means.

3. A baler of the class described comprising an elongated frame having a compression-chamber at each end thereof, a plunger disposed in said frame and between said chambers, means to direct hay or the like into the path of said plunger, a cross-head secured to said plunger, cables secured to said cross-head at each end thereof, shafts transversely disposed below said frame, channeled drums carried by said shafts adapted to receive said cables, a bevel-gear secured to each of said shafts, mutilated gears adapted to intermittently mesh with said bevel-gears, a shaft for said mutilated gears, a power-shaft, means carried thereon to apply power, and gearing interposed between said power-shaft and the shaft carrying the mutilated gears to rotate said gears.

In testimony whereof I have signed my name to this specification in the presence of two subscribing witnesses.

JOHN J. HUGGINS.

Witnesses:
   ED. THOMAS,
   J. V. HEFLEY.